June 11, 1963  H. STRAUB ETAL  3,093,227
STATIONARY FIELD CLUTCH WITH SLANTED AIR GAP
Filed May 6, 1959  2 Sheets-Sheet 1

INVENTORS
HERMANN STRAUB
ANSELM BLUM
BY
ATTORNEYS

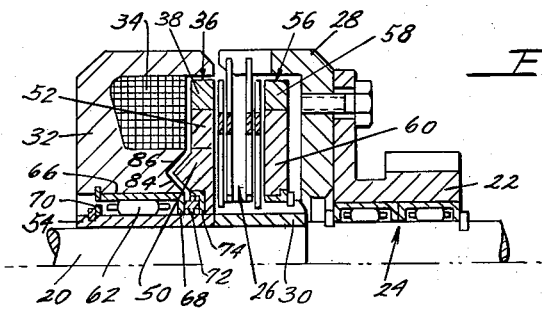
FIG-6-
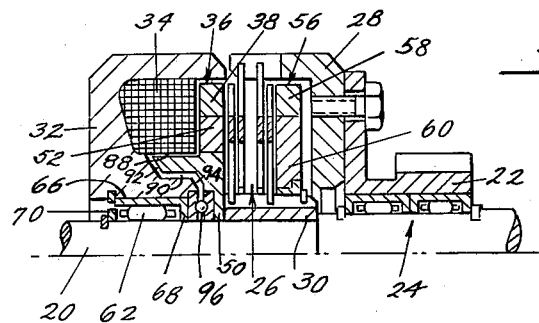
FIG-7-
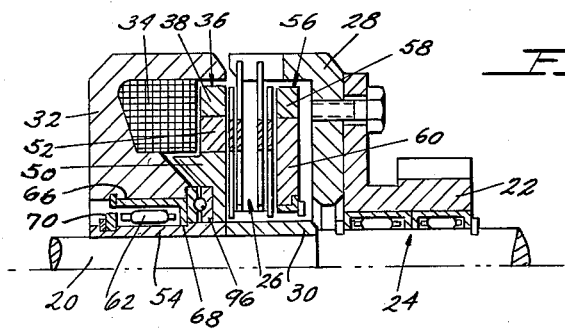
FIG-8-
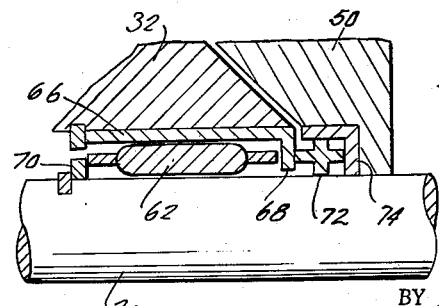
FIG-9-
INVENTORS
HERMANN STRAUB
ANSELM BLUM
BY
ATTORNEYS

United States Patent Office 3,093,227
Patented June 11, 1963

3,093,227
STATIONARY FIELD CLUTCH WITH SLANTED
AIR GAP
Hermann Straub, Friedrichshafen, and Anselm Blum, Kehlen, Germany, assignors to I-T-E Circuit Breaker Company, Philadelphia, Pa., a corporation of Pennsylvania
Filed May 6, 1959, Ser. No. 811,428
4 Claims. (Cl. 192—84)

Our invention relates to a novel stationary field type of clutch utilizing a novel bearing support means for supporting the stationary magnet from the shaft of the clutch and for decreasing axial force upon the magnet, in combination with a novelly slanted air gap for leading the flux from the stationary portion of the energizing magnet to the rotatable portion of the energizing magnet.

Stationary field clutches are well-known in the art, and are typically set forth in copending applications Serial No. 548,801, filed November 25, 1955, now Patent No. 2,989,161 issuing June 20, 1961, and Serial No. 806,355, filed April 14, 1959.

In a clutch using a stationary field winding and a stationary magnetic structure, it is necessary to generate magnetic flux through a movable magnetic structure positioned adjacent the stationary structure, and thence through interleaved laminations which are alternately connected to a driving shaft and a driven member. Thus, when the stationary coil carried by the stationary magnet is energized, the magnetic flux will compress the laminations and connect the driving shaft to the driven member.

In mounting the stationary magnet structure, it is generally necessary that the magnetic structure surround one of the driving or driven members which is usually in the form of a shaft. Thus, a bearing means is necessarily interposed between the inner-diameter of the stationary magnet portion and the outer-diameter of the shaft carrying the stationary magnet. Furthermore, when the flux passes from the stationary magnet to the movable portion of the magnet, there will be an attractive force upon the stationary magnet tending to move it axially with respect to the shaft so that a further bearing means is necessary to support this axial force.

In the present invention we have formed a novel bearing system for both supporting the stationary magnet with respect to the shaft and the axial forces, in combination with a magnetic structure in which the axial forces upon the stationary magnet are reduced to a relatively low value so that the axial bearing is not subjected to high loads.

Regarding the reduction of the magnetic axial force on the stationary magnet, we have found that by placing the air gap between the stationary portion and movable portion of the magnetic structure at an angle different than 90°, the axial force on the stationary magnet is reduced. More specifically, we have found that this attractive magnetic force is proportional to the square of the magnetic flux divided by the area of the air gap through which the flux passes. Thus, by increasing this area, the force will be decreased, if flux is maintained constant by proper selection of necessary ampere turns.

In view of this reduction in axial force, it is now possible to form the supporting bearing for the clutch in such a manner that the same race for the needle bearing which supports the stationary magnet body from the shaft can be used for an axial thrust bearing. Therefore, the overall size of the clutch may be decreased, since the bearing requirements for mounting the stationary magnet are reduced.

If desired, this outer bearing race, which serves a dual function, may be made of a non-magnetic material so that the bearing may ride directly on the shaft rather than on a second race on the shaft, and, thus, continue to decrease the size of the clutch.

Accordingly, a primary object of our invention is to form a novel stationary field clutch having a relatively small size.

Another object of our invention is to provide a novel stationary field clutch wherein the axial force on the stationary magnet is substantially decreased.

A further object of our invention is to provide a novel stationary field clutch in which a simple bearing structure for both supporting the stationary magnet with respect to the shaft and preventing axial motion of the shaft is economically formed.

A still further object of our invention is to provide a slanted air gap between the stationary portion and movable portion of the magnetic structure of a stationary field clutch.

These and other objects of our invention will become apparent from the following description when taken in connection with the drawings, in which:

FIGURE 6 is similar to FIGURES 3 and 4, but shows a second embodiment of the manner in which the slanted air gap may be formed.

FIGURE 7 shows a still further embodiment of the formation of the slanted air gap.

FIGURE 8 shows the use of the slanted air gap in combination with a needle bearing and axial ball bearing.

FIGURE 9 shows the use of the slanted air gap in combination with the presently commercially available needle bearing and axial roller bearing for supporting the magnetic structure.

Figure 1:
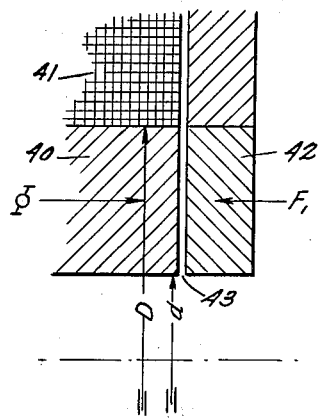
FIGURE 1 illustrates the air gap of a prior art clutch, and shows the forces between the stationary portion of the magnet structure and the movable portion of the magnet structure.

Referring first to FIGURE 1, the usual manner in which a stationary field clutch is formed is seen by the stationary magnet portion 40 which carries the energizing winding 41, and is adjacently positioned with respect to a movable magnetic portion 42.

The flux $\phi$ necessarily passes from the stationary portion 40 through the air gap 43 to a rotatable portion 42 of the magnetic structure. This flux creates a force $F_1$ between the stationary and movable magnet portions 40 and 42 respectively which will tend to move stationary magnet structure 40 to the right.

This magnetic force is computed from the relation:

$$F = A\frac{\left(\frac{B}{1000}\right)}{24.7}$$

where

F is the force in kilograms,
A is the cross-sectional area of air gap 43 in square centimeters, and
B is the flux density in gauss.
The area A may, of course, be computed by knowing the diameters D and $d$, which are the outer-diameter and inner-diameter respectively of air gap 43.

Thus, the area of air gap 43 is $$A = \frac{D^2\pi}{4} - \frac{d^2\pi}{4}$$

Figure 2:
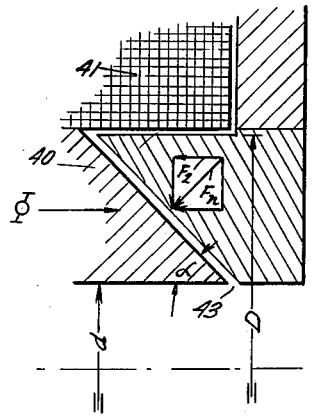
FIGURE 2 shows the manner in which the clutch structure of FIGURE 1 is modified by the slanted air gap of the present invention.

If now, as seen in FIGURE 2, the air gap 43 is slanted so as to form an angle $\alpha$ other than 90° with respect to the axis of the magnet body, it will be apparent that the area of the air gap will be increased by $$\frac{1}{\sin \alpha}$$

Accordingly, it would then follow that $$F_2 = F_n \sin \alpha$$

where $F_2$ is the axial force and
$F_n$ is the force normal to the air gap 43.

If the air gap path lengths of both arrangements are approximately equal, the reluctance of the second air gap is now smaller than the reluctance in this first arrangement. Assuming that magnetic flux and hence mechanical torque of both clutches are identical through the proper selection of ampere turns of the magnet coil in the second arrangement, the following will be seen to be true.

The above relations then reduce to $$F_2 = F_1 \sin^2 \alpha$$

Accordingly, if $\alpha$ is equal to 45°, then the axial force $F_2$ of FIGURE 2 is clearly only ½ of the force $F_1$ of the radial gap of FIGURE 1.

Again, if $\alpha$ were made 30°, then the force $F_2$ would be ¼ of that of force $F_1$ in FIGURE 1.

Therefore, our novel concept of slanting the air gap leads to the highly unexpected result of substantially decreasing the axial force on the stationary magnet structure 40 so as to permit the use of simplified bearing support means.

Figure 3:
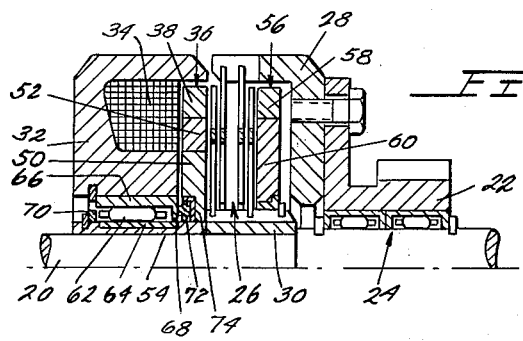
FIGURE 3 shows an electromagnetic clutch having the bearing construction of our invention in the absence of a slanted air gap.

The first embodiment of our novel bearing support means is best shown in FIGURE 3.

In FIGURE 3, a shaft 20 supports a gear 22 through the bearing means 24 whereby the gear 22 is rotatable with respect to shaft 20. The purpose of the clutch is to selectively connect and disconnect shaft 20 and gear 22 through the interleaved lamination pack 26. Thus, the gear 22 has a plurality of radially extending fingers, such as finger 28, which are bolted to gear 22 and are connected to the outer diameter of alternate laminations of lamination pack 26 in the standard manner. The remaining laminations are splined to a non-magnetic bushing 30 which is fastened to shaft 20 in any desired manner whereby these laminations rotate with the shaft 20.

In order to compress the lamination pack 26 and thus connect shaft 20 to gear 22 through bushing 30, lamination pack 26, and member 28, a magnetic structure of the stationary type is provided which includes a stationary magnetic housing 32 (which corresponds to stationary portion 40 of FIGURES 1 and 2), and carries an energizable winding 34 (which corresponds to winding 41 of FIGURES 1 and 2). The movable portion of the magnet structure is comprised of the relatively thick disk, generally seen as disk 36, which is comprised of annular magnetic portions 38 and 50 which are joined by a non-magnetic portion 52. Movable magnetic portion 36 of the magnet structure is directly fastened to a non-magnetic bushing 54 which is directly connected to shaft 20 in any desired manner. The movable magnetic disk 36 will act as a pressure plate to receive the left-hand side of the lamination pack 26 when the winding 34 is energized.

An armature 56 is splined to bushing 30, and, as is the case for all the laminations of lamination pack 26, is capable of moving along the axial direction of shaft 20. Note that armature 56 is of the split ring type so that ring 58 is movable independently of ring 60 whereby a more even distribution of force across lamination pack 26 is possible.

From this structure, it will now be apparent that energization of magnet winding 34 will generate a flux from the top of the magnet structure 32 through the air gap parallel to the axis of shaft 20 to ring 38 and thence through the lamination pack 26 to ring 56. The flux will then return through the lamination pack 26 to ring 50 and back to the stationary magnet 32 through the radial gap between movable magnetic portion 50 and stationary magnetic portion 32 of the magnetic structure. Note that, as is the case in all electromagnetic clutches of the lamination type, the laminations or disks have an intermediate non-magnetic insert or air gap to prevent the short circuiting of the above noted flux path. The magnetic flux will attract armature 56 to the left to cause compression of lamination back 26 so that member 28 and thus gear 22 are mechanically coupled to bushing 30 and shaft 20.

As seen in FIGURE 3, the stationary magnetic structure 32 is supported with respect to shaft 20 by needle bearings such as bearing 62. More specifically, bushing 54 which has been previously described as secured to shaft 20 and is formed of a non-magnetic material has a race 64 which may be a hardened steel bushing pressed thereon. Race 64 can be replaced by the application of a layer of hard chromium to the surface of bushing 54, if desired.

An outer ring 66 for needle bearing 62 is secured to stationary magnetic body 32 in any desired manner, and is terminated on the right-hand side by a radial extension 68. Radial extension 68 secures bearing 62 against motion in a right-hand direction, while a typical retaining ring 70 secures needle bearing 62 against left-hand motion. The radially extending wall 68 then serves a novel dual function whereby its outer surface serves as a race for the axial roller bearing 72 which serves to maintain movable magnetic portion 36 in a spaced relation with respect to stationary magnet 32. The other race for roller bearing 72 is formed by a flange ring 74 which is pressed into the movable magnetic structure 36, as shown.

Figure 4:
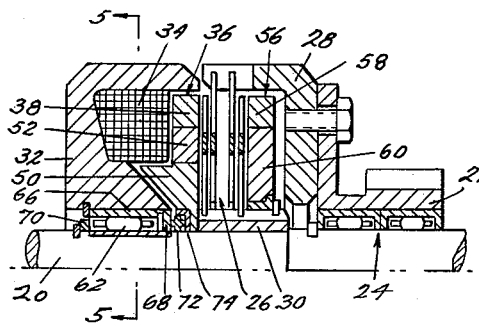
FIGURE 4 illustrates the combination of the slanted air gap to reduce axial thrust and the bearing structure of the invention.

While this bearing structure is highly desirable, since the radial extension 68 serves as both a limit for needle bearing 62 as well as a race for roller bearing 72, it will be apparent that this structure should not be used in the presence of substantial axial forces on the movable magnet body 36. In order to reduce these forces, we have provided the aforementioned sloped air gap between the stationary magnet 32 and movable magnetic portion 50, as seen in FIGURE 4. Note that in FIGURE 4 substantially the same structure is shown as in FIGURE 3 with similar numerals identifying similar components. In FIGURE 4, however, the movable magnetic portion 50 has a conically shaped surface which cooperates with the lower conically shaped surface of magnet 32.

The specific manner in which the stationary magnet structure is supported from shaft 20 in FIGURE 4 is best seen in FIGURE 9 where the needle bearing 62 rides directly on the hardened surface of shaft 20 adjacent needle bearing 62. The outer ring 66, however, is formed in a manner identical to that described above in FIGURE 3 where the ring 66 has a radially extending wall 68 which serves to both limit the motion of needle bearing 62 and as a race for the roller bearing 72 in combination with ring 74 carried by movable magnet portion 50.

Because of the sloped air gap, it is clear that the reduction in the axial force on movable magnet portion 50 will render the bearing structure shown in FIGURES 4 and 9 highly desirable.

In order to prevent the short circuiting of flux in the embodiment of FIGURES 4 and 9, the needle cage is preferably formed of a non-magnetic material, such as brass, and the needle bearings are arranged at a relatively great distance from one another.

Figure 5:
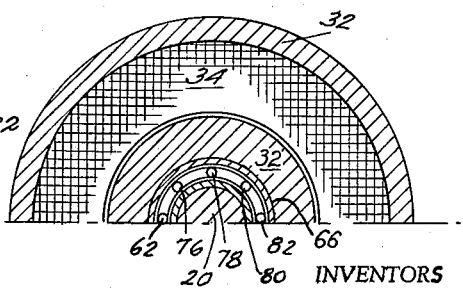
FIGURE 5 is a cross-sectional view of FIGURE 4 when taken across the line 5—5.

This may be best seen in FIGURE 5 in which the needle bearings 62, 76, 78, 80 and 82 have a relatively great spacing from one another. This structure can be easily formed from a commercially available needle cage in which a portion of the bearing needles are removed.

As was the case in FIGURE 3, in the embodiment of FIGURE 4, the inner lamination support for bushing 30 is preferably made of a non-magnetic material to prevent the passage of flux through the shaft 20, instead of through the lamination pack 26.

Although FIGURE 4 shows our novel air gap as having a conically shaped cross-section, it will be apparent that this is only one way to make the length of the air gap relatively large. Thus, in FIGURE 6 which shows a magnet structure support similar to that of FIGURE 3, the air gap is formed of two intersecting cones 84 and 86. In all other respects, however, the clutch of FIGURE 6 is similar to FIGURE 3, although it has the advantage of the reduced axial thrust on the movable magnetic structure 36.

A still further variation of our novel concept is seen in FIGURE 7 where the air gap between the movable and stationary magnetic portions of the magnetic structure is formed by two axial gaps 88 and 90 which are joined by gap 92, and the air gap is then completed by gap portion 94 where gaps 92 and 94 are non-radial. In this type of structure, a ball bearing arrangement 96 is used to space the movable magnetic portion 36 from the stationary magnetic portion 32 of the magnetic structure in the usual manner. Note, however, that the length of the air gap is substantially increased over the typical radial air gap of the prior art.

Although FIGURE 7 shows the usual ball bearing spacing structure, it will be apparent that the concept of our invention whereby the outer ring 66 serves as a race for the axial bearing can be followed, as shown in FIGURE 8. Thus, in FIGURE 8 the radial extension 68 of ring 66 serves as the support for the race for ball bearing 96.

Although we have described preferred embodiments of our novel invention, many variations and modifications will now be obvious to those skilled in the art, and we prefer therefore to be limited not by the specific disclosure herein but only by the appended claims.

We claim:

1. In an electromagnetic clutch; a magnetic structure comprised of a movable portion and a stationary portion; a rotatable shaft means extending through said magnetic structure; said movable magnetic portion being positioned adjacent said stationary portion and being attracted to said stationary portion when magnetic flux flows from said stationary portion to said movable portion; a first bearing means for supporting said stationary magnetic portion with respect to said rotatable shaft and a second bearing means for maintaining said movable magnetic portion at a predetermined axial spacing with respect to said stationary magnetic portion; said first bearing means including a needle bearing contained within a bushing forming an axially directed outer race; said bushing having a radial extension; said radial extension forming an abutment for receiving said second bearing means.

2. In an electromagnetic clutch; a magnetic structure comprised of a movable portion and a stationary portion; a rotatable shaft means extending through said magnetic structure; said movable magnetic portion being positioned adjacent said stationary portion and being attracted to said stationary portion when magnetic flux flows from said stationary portion to said movable portion; a first bearing means for supporting said stationary magnetic portion with respect to said rotatable shaft and a second bearing means for maintaining said movable magnetic portion at a predetermined axial spacing with respect to said stationary magnetic portion; said first bearing means including a needle bearing contained within a bushing forming an axially directed outer race; said bushing having a radial extension; said radial extension forming an abutment for receiving said second bearing means; said second bearing means including a roller bearing.

3. In an electromagnetic clutch; a magnetic structure comprised of a movable portion and a stationary portion; a rotatable shaft means extending through said magnetic structure; said movable magnetic portion being positioned adjacent said stationary portion and being attracted to said stationary portion when magnetic flux flows from said stationary portion to said movable portion; a first bearing means for supporting said stationary magnetic portion with respect to said rotatable shaft and a second bearing means for maintaining said movable magnetic portion at a predetermined axial spacing with respect to said stationary magnetic portion; said first bearing means including a needle bearing; and a needle cage said needle cage being comprised of a bushing forming an axially directed outer race; said bushing having a radial extension; said radial extension forming an abutment for receiving said second bearing means; said needle cage being of non-magnetic material.

4. In an electromagnetic clutch; a magnetic structure comprised of a movable portion and a stationary portion; a rotatable shaft means extending through said magnetic structure; said movable magnetic portion being positioned adjacent said stationary portion and being attracted to said stationary portion when magnetic flux flows from said stationary portion to said movable portion; a first bearing means for supporting said stationary magnetic portion with respect to said rotatable shaft and a second bearing means for maintaining said movable magnetic portion at a predetermined axial spacing with respect to said stationary magnetic portion; said first bearing means including a needle bearing; and a needle cage said needle cage being comprised of a bushing forming an axially directed outer race; said bushing having a radial extension; said radial extension forming an abutment for receiving said second bearing means; said needle cage being of non-magnetic material; said needle bearing having an internal race formed by a hardened surface portion of said shaft.

References Cited in the file of this patent

UNITED STATES PATENTS

| 747,706 | Hewlett | Dec. 22, 1903 |
| 945,806 | Rhodes | Jan. 11, 1910 |
| 2,035,160 | Herold | Mar. 24, 1936 |
| 2,722,846 | McDonald | Nov. 8, 1955 |
| 2,724,281 | Summers et al. | Nov. 22, 1955 |
| 2,729,318 | Harter | Jan. 3, 1956 |
| 2,899,036 | Ryba | Aug. 11, 1959 |
| 2,956,657 | Rudisch | Oct. 18, 1960 |
| 2,989,161 | Diebold | June 20, 1961 |

FOREIGN PATENTS

| 364,330 | Great Britain | Jan. 7, 1932 |